US009963134B2

(12) United States Patent
Ross et al.

(10) Patent No.: US 9,963,134 B2
(45) Date of Patent: May 8, 2018

(54) METHOD FOR CONTROLLING A BRAKE SYSTEM, AND BRAKE SYSTEM IN WHICH THE METHOD IS CARRIED OUT

(71) Applicant: Continental Teves AG & Co. oHG, Frankfurt (DE)

(72) Inventors: Scott F. Ross, Steinbach (DE); Alexander Schönbohm, Bad Nauheim (DE); Florian Mathis, Dillingen/Saar (DE)

(73) Assignee: Continental Teves AG & Co. oHG, Frankfurt (DE)

( * ) Notice: Subject to any disclaimer, the term of this patent is extended or adjusted under 35 U.S.C. 154(b) by 0 days. days.

(21) Appl. No.: 14/915,721

(22) PCT Filed: Sep. 26, 2014

(86) PCT No.: PCT/EP2014/070686
§ 371 (c)(1),
(2) Date: Mar. 1, 2016

(87) PCT Pub. No.: WO2015/044383
PCT Pub. Date: Apr. 2, 2015

(65) Prior Publication Data
US 2016/0207511 A1    Jul. 21, 2016

(30) Foreign Application Priority Data
Sep. 26, 2013    (DE) ........................ 10 2013 219 458

(51) Int. Cl.
*B60T 8/26* (2006.01)
*B60T 8/48* (2006.01)
(Continued)

(52) U.S. Cl.
CPC .............. *B60T 8/267* (2013.01); *B60T 7/042* (2013.01); *B60T 8/4081* (2013.01);
(Continued)

(58) Field of Classification Search
CPC .......... B60T 8/267; B60T 7/042; B60T 13/14; B60T 8/4081; B60T 13/686; B60T 8/4872; B60T 8/4072
(Continued)

(56) References Cited

U.S. PATENT DOCUMENTS 5,727,852 A * 3/1998 Pueschel ................. B60T 8/175
188/DIG. 1
5,853,229 A    12/1998 Willmann
(Continued)

FOREIGN PATENT DOCUMENTS

CN       1721246 A      1/2006
CN    102822025 A    12/2012
(Continued)

OTHER PUBLICATIONS

German Search Report for German Application No. 10 2013 219 458.7 dated Feb. 10, 2014, including partial translation.
(Continued)

*Primary Examiner* — Thomas J Williams
*Assistant Examiner* — Mariano Sy
(74) *Attorney, Agent, or Firm* — RatnerPrestia

(57) ABSTRACT

A method for controlling and/or regulating a motor vehicle brake system. The system at least one electric regenerative brake and wheel brakes. A pressure medium is supplied from a first pressure source actuated by the driver. At least one brake circuit has a pressure accumulator, a second pressure source connected to the pressure accumulator, and at least two actuatable valves. When an activation condition is met, the first pressure source is separated from the wheel brakes by closing a first valve in at least one active brake circuit, and pressure medium is conducted from the pressure accumulator into at least one wheel brake. A second valve of an active brake circuit(s), is between the pressure accumulator
(Continued)

and the first pressure source, and the first valve of the same brake circuit are opened during the operation of the second pressure source if a ventilation condition is met.

12 Claims, 1 Drawing Sheet

(51) Int. Cl.
*B60T 7/04* (2006.01)
*B60T 8/40* (2006.01)
*B60T 13/14* (2006.01)
*B60T 13/68* (2006.01)

(52) U.S. Cl.
CPC ............ *B60T 8/4872* (2013.01); *B60T 13/14* (2013.01); *B60T 13/686* (2013.01); *B60T 8/4072* (2013.01)

(58) Field of Classification Search
USPC ........ 303/3, 113.2, 113.4, 116.1, 116.2, 152, 303/DIG. 11
See application file for complete search history.

(56) References Cited

U.S. PATENT DOCUMENTS

| | | | |
|---|---|---|---|
| 6,145,940 A | 11/2000 | Fuhrer | |
| 6,241,323 B1 * | 6/2001 | Wagner | B60T 8/3275 303/113.4 |
| 6,419,329 B1 | 7/2002 | Buschmann | |
| 7,896,448 B2 * | 3/2011 | Bareiss | B60T 8/404 303/1 |
| 7,992,947 B2 * | 8/2011 | Kaestner | B60T 8/36 303/119.2 |
| 9,043,109 B2 | 5/2015 | Romero | |
| 9,333,957 B2 * | 5/2016 | Ross | B60T 8/4872 |
| 2007/0296264 A1 * | 12/2007 | Haupt | B60L 7/26 303/3 |
| 2009/0189440 A1 * | 7/2009 | Abe | B60T 8/321 303/114.1 |
| 2010/0244552 A1 * | 9/2010 | Weh | B60T 8/4275 303/116.1 |
| 2011/0248559 A1 * | 10/2011 | Vollert | B60T 1/10 303/3 |
| 2012/0299367 A1 | 11/2012 | Ross | |

FOREIGN PATENT DOCUMENTS

| | | |
|---|---|---|
| DE | 19604134 | 8/1997 |
| DE | 10347789 | 5/2005 |
| DE | 102004029838 | 12/2005 |
| DE | 102006036679 | 12/2007 |
| DE | 102010042589 | 4/2012 |
| DE | 102013202789 | 8/2013 |
| WO | 9713670 | 4/1997 |
| WO | 9920509 | 4/1999 |
| WO | 2011092308 | 8/2011 |

OTHER PUBLICATIONS

International Search Report for International Application No. PCT/EP2014/070686 dated Nov. 3, 2014.
Written Opinion of the International Searching Authority for International Application No. PCT/EP2014/070686 dated Nov. 3, 2014.
Chinese Office Action for Chinese Application No. 201480053097.0, dated Jul. 26, 2017, including English translation, 17 pages.

* cited by examiner

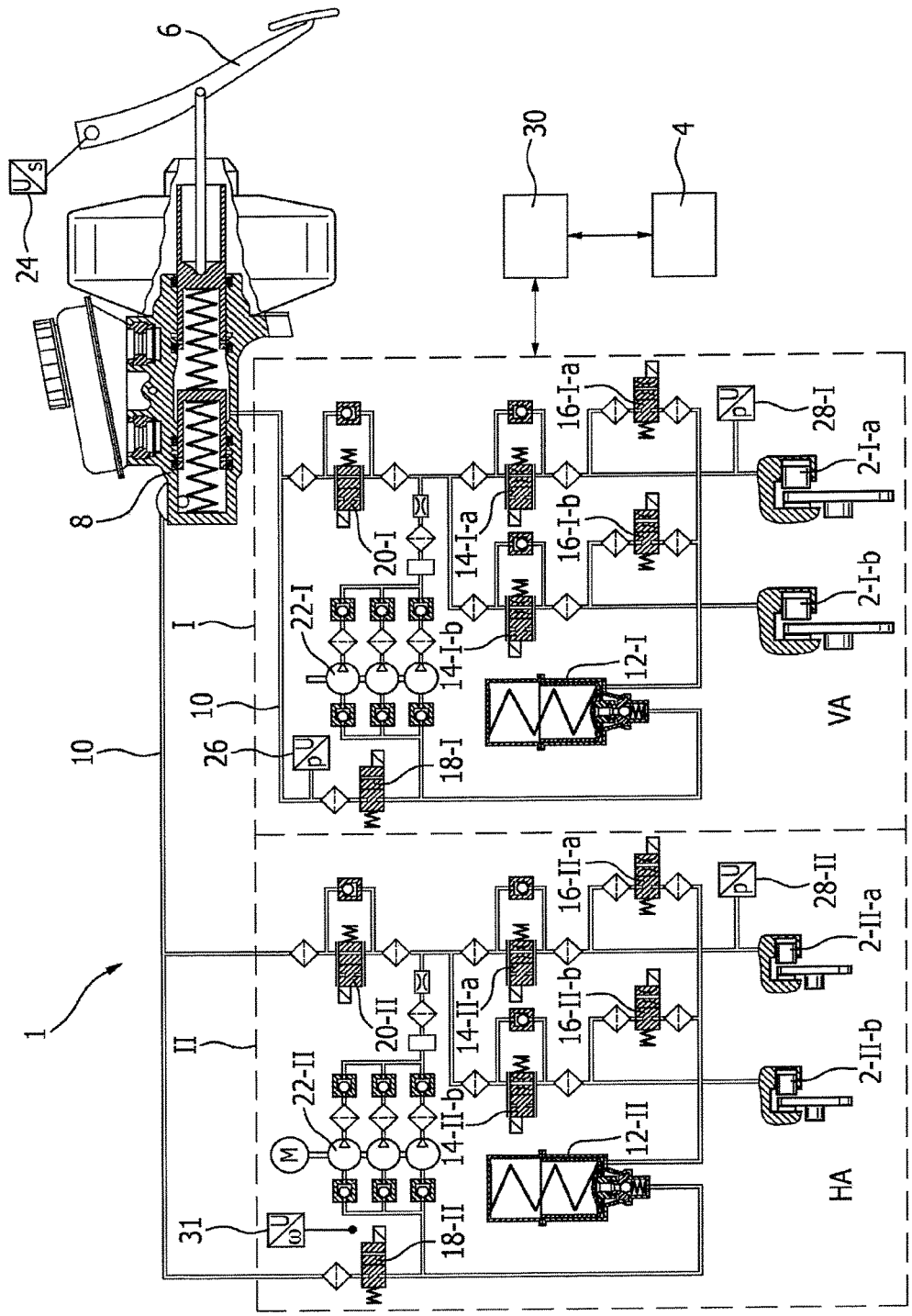

METHOD FOR CONTROLLING A BRAKE SYSTEM, AND BRAKE SYSTEM IN WHICH THE METHOD IS CARRIED OUT

CROSS REFERENCE TO RELATED APPLICATIONS

This application is the U.S. National Phase Application of PCT International Application No. PCT/EP2014/070686, filed Sep. 26, 2014, which claims priority to German Patent Application No. 10 2013 219 458.7, filed Sep. 26, 2013, the contents of such applications being incorporated by reference herein.

FIELD OF THE INVENTION

The invention relates to a method for controlling a brake system and to a brake system.

BACKGROUND OF THE INVENTION

Hybrid vehicles, which are driven by an internal combustion engine and one or more electric machines, or purely electrically driven vehicles can operate the electric machine (s) as a generator during a brake actuation in order to convert the kinetic energy of the vehicle into electric energy and advantageously store said electric energy in a battery.

WO 2011/092308 A1, which is incorporated by reference discloses a brake system for a motor vehicle, which comprises at least one electric regenerative brake and one pressure medium-operated brake system having wheel brakes, wherein the wheel brakes assigned to the individual wheels are disposed in two brake circuits, to which a pressure medium can be supplied from a first braking pressure-generating means, a tandem master brake cylinder, and wherein each brake circuit comprises at least one pressure accumulator and electronically controllable hydraulic valves, and wherein the brake system comprises an electronic control and regulating unit, by means of which, during braking with the electric regenerative brake(s), at least one hydraulic valve is controlled in such a way that pressure medium is diverted into exactly one, in particular predetermined, pressure accumulator at a point in time. A pressure accumulator is therefore filled at the beginning of a brake actuation, in order provide the driver with the usual pedal feel also during a generator operation of the electric machine. As soon as the first pressure accumulator has a specified fill level, pressure medium is preferably diverted into the pressure accumulator of the second brake circuit. The diverted quantity of pressure medium or brake fluid does not contribute to the pressure increase in the wheel brakes of the vehicle wheels and can vary as a function of the particular generator torque that can be applied, the brake activation by the driver, and the brake circuit split.

An induction-based generator loses nearly all its braking effect at low speeds, which is why the missing drag torque of the generator must be compensated for with the aid of the wheel brakes. This transition between the drag torque of the generator and the braking torque of the wheel brakes, which is also referred to as blending, often takes place in that pressure is built up in the wheel brakes via a pump, which is fed from the pressure accumulator, wherein the pumps of the two brake circuits are usually operated by a common motor. Depending on the brake circuit split, the generator torque that is available at any instant, and the brake activation by the driver, it is possible that the two low-pressure accumulators may not contain an equivalent amount of brake fluid, for reasons related to the system. As a result, while the pump still delivers in one brake circuit, the deliverable volume has been used up in the other brake circuit and a negative pressure sets in, in which vapor pockets can also form. According to the cited prior art, a resultant negative pressure is relieved by temporarily opening the electronic switching valve disposed between the pressure accumulator and the master brake cylinder as soon as the brake actuation has ended; this is also referred to as an electronic switching valve degassing pulse.

A corresponding blending also occurs in the case of a gentle brake activation, in which the vehicle is braked to a standstill with slow deceleration. As a result of the gentle brake activation, the low-pressure accumulators are only partially filled, and even if the pump is activated at a low speed, a negative pressure would be present in a brake circuit, on the suction side of the hydraulic pump, for a relatively long time, which can have detrimental effects on the bleeding state of the brake system.

SUMMARY OF THE INVENTION

The problem addressed by an aspect of the present invention is therefore that of relieving or preventing a negative pressure on the suction side of a hydraulic pump also during a gentle brake activation.

A method is therefore provided, in which a brake system for a motor vehicle is controlled and/or regulated, said system comprising at least one electric regenerative brake and one or more, in particular four, wheel brakes to which pressure medium can be supplied from a first pressure source, in particular a tandem master brake cylinder, which wheel brakes can be actuated by the driver using a brake pedal, and in which one or more, in particular two, brake circuits are disposed, wherein at least one brake circuit has a pressure accumulator, a second pressure source, in particular an electric hydraulic pump, which is connected to the pressure accumulator on the suction side, and at least two actuatable valves, wherein, as soon as an activation condition is met, the first pressure source is separated from the wheel brakes by closing a first valve, in particular a solenoid valve that is open when currentless, in at least one active brake circuit, and pressure medium is delivered from the pressure accumulator into at least one wheel brake by activating the second pressure source. According to the invention, a second valve, in particular a solenoid valve that is closed when currentless, said second valve being disposed between the pressure accumulator and the first pressure source, of the active brake circuit(s), and the first valve of the same brake circuit are opened during operation of the second pressure source when a bleeding condition is met.

Given that the second pressure source or the pump is operated while the first and the second valves are open, the situation is prevented in which a vacuum is present at the suction side of the pump for a relatively long time. Gas pockets are therefore prevented from forming in the brake fluid. In this case, the valves are subjected to only a slight additional load by switching processes.

Advantageously, the bleeding condition is met only when the activation of a brake pedal activated by the driver lies in a specified interval at a specified time or for a specified period of time after the activation condition is met and/or after activation of the second pressure source. A brake activation in the specified interval advantageously means that the driver carries out a gentle brake activation by continuing to press on the brake pedal. In particular, a displacement or angle sensor connected to the brake pedal is considered in order to determine the extent of an activation of the brake pedal. In this case, a displacement sensor is also understood to be a switch, the switching state of which changes given a specified extent of the actuation of the brake pedal. Alternatively or for the purpose of validation, the extent of the actuation of the brake pedal can also be determined on the basis of a pressure sensor that is hydraulically connected to the first pressure source and/or on the basis of a vehicle deceleration determined with the aid of wheel speed sensors.

Particularly advantageously, it can also be provided that the bleeding condition is met only when the pressure accumulator of at least a first brake circuit contains less than a specified volume of pressure medium and/or the second pressure source of at least a first brake circuit has delivered pressure medium during at least one specified period of time. It is thereby ensured that a valve is actuated only when necessary.

Preferably, the activation condition is met when the activation of a brake pedal activated by the driver exceeds a specified extent, wherein, in particular, a displacement or angle sensor or switch that is connected to the brake pedal is considered, and/or the braking torque that is built up by and/or can be attained by the electric regenerative brake drops below a specified threshold value. If the built-up braking torque of the generator decreases while the brake activation by the driver remains unchanged, blending or activation of the hydraulic pump is required.

When the brake system comprises a first and a second brake circuit, each of which has a pressure accumulator, a second pressure source, a controllable first valve, in particular a solenoid valve that is open when currentless, which is disposed between a first pressure source and wheel brakes, a controllable second valve, in particular a solenoid valve that is closed when currentless, which is disposed between the pressure accumulator and the first pressure source, and at least one controllable third valve, in particular a solenoid valve that is closed when currentless, which is disposed between the wheel brake and the pressure accumulator, it is advantageous when, during a brake activation, pressure medium is first diverted into the pressure accumulator of the first brake circuit and then into the pressure accumulator of the second pressure circuit by opening a third valve. By means of the sequential filling, it can be precisely determined how much pressure medium in the pressure accumulator of the first and the second brake circuit was diverted. Preferably, the activation condition can be met only when pressure medium was diverted at least into the pressure accumulator of the first brake circuit. This prevents the pump from being actuated when pressure accumulators are empty from the start.

When the second pressure source of the first and the second brake circuit are simultaneously activated (e.g., due to the design of the pump), it is particularly advantageous that the second valve and the first valve of the brake circuit having the pressure accumulator with the lower fill level are opened when the bleeding condition is met. The other brake circuit can still compensate for a decreasing generator torque; simultaneously, the number of additional valve actuations is limited and, therefore, the service life of the brake system is ensured.

The fill level of a pressure accumulator is determined, in particular, on the basis of a duration and/or an opening cross-section and/or a valve flow of the second valve, which is opened at least temporarily, and/or a duration of the activation and/or a variable characterizing the pressure generation, preferably a speed, of the second pressure source.

For example, the signals of a rotor position sensor of the electric drive of the hydraulic pump can be considered in order to consider, for example, the speed of the drive as the variable characterizing the pressure generation.

It is particularly advantageous when the second valve of both the first and the second brake circuit are temporarily opened after the brake pedal is no longer actuated and/or the second pressure sources were deactivated, which is detected, in particular, by means of a displacement or angle sensor connected to the brake pedal. After each case of blending, it makes sense for a switching of the electronic switching valve to take place after the brake pedal is released. Pressure compensation between the low-pressure accumulator and the tandem master cylinder or reservoir is therefore ensured.

It can also be preferably provided that the first valve of the brake circuit having the pressure accumulator with the higher fill level is also opened when a bleeding condition is met. This has the advantage that small pressure differences between the brake circuits are also prevented.

An aspect of the invention further relates to a brake system for a motor vehicle, said system comprising at least one electric regenerative brake and one or more, in particular four, wheel brakes to which pressure medium can be supplied from a first pressure source, in particular a tandem master brake cylinder, that can be actuated by the driver by means of a brake pedal, and in which one or more, in particular two, brake circuits are disposed, wherein at least one brake circuit has a pressure accumulator, a second pressure source, in particular an electric hydraulic pump, and at least two controllable valves, and wherein the brake system comprises an electronic control unit, which carries out a method according to an aspect of the invention.

According to a preferred embodiment of the invention, assigned to each wheel brake of a brake circuit is an inlet valve, in particular a solenoid valve that is open when currentless, disposed between the first pressure source and the wheel brake, and an outlet valve disposed between the wheel brake and the pressure accumulator, wherein the second pressure source of a brake circuit is connected to the pressure accumulator on the suction side and, on the outlet side, is disposed between the first pressure source and the inlet valves of the brake circuit, and wherein an isolating valve, in particular a solenoid valve that is open when currentless, is disposed between the outlet side of the second pressure source and the first pressure source, and a switching valve, in particular a solenoid valve that is closed when currentless, is disposed between the suction side of the second pressure source and the first pressure source, wherein the electronic control unit controls the isolating valve as the first valve and controls the switching valve as the second valve while a method according to the invention is carried out in at least one brake circuit.

If the motor vehicle comprises two axles, each having two wheels and assigned wheel brakes, the wheel brakes of the front axle can be disposed in a first brake circuit and the wheel brakes of the rear axle can be disposed in a second brake circuit, which is also known as a black/white split. According to a first preferred embodiment of the brake system according to the invention, the motor vehicle therefore comprises two axles, each having two wheels and assigned wheel brakes, wherein the wheel brakes of the front axle are disposed in a first brake circuit and the wheel brakes of the rear axle are disposed in a second brake circuit.

Alternatively, in a corresponding four-wheel motor vehicle, one wheel brake of the front axle and one wheel brake of the rear axle can be disposed in a respective brake circuit, which is also referred to as a diagonal split. According to a second preferred embodiment of the brake system according to the invention, the motor vehicle comprises two axles, each having two wheels and assigned wheel brakes, which are split into two brake circuits, wherein one wheel brake of the front axle and one wheel brake of the rear axle are disposed in a respective brake circuit.

The method according to an aspect of the invention can be used, in principle, regardless of the brake system split. In the case of a sequential filling of the pressure accumulators, the brake system in which the bleeding condition is met can be easily determined, also for a diagonal split of the brake system.

Advantageously, the second pressure source is designed as an electrically driven piston pump, which has a rotor position sensor connected to the control unit. This allows for particularly precise control of the second pressure source.

BRIEF DESCRIPTION OF THE DRAWINGS

Further preferred embodiments will become apparent from the dependent claims and the subsequent description of an exemplary embodiment with reference to a FIGURE.

In the drawing:

FIG. 1 shows an exemplary embodiment of a brake system in the non-actuated state.

DETAILED DESCRIPTION OF THE PREFERRED EMBODIMENTS

FIG. 1 shows an exemplary embodiment of a brake system 1 for a motor vehicle, which system is suitable for carrying out the method according to an aspect of the invention. The driver of the motor vehicle demands a deceleration of the vehicle via the brake pedal 6, i.e., said driver applies the brake. In order to build up a braking torque by means of the wheel brakes 2, which are designed as friction brakes, the brake system 1 is provided with a first pressure source 8, which is designed as a tandem master brake cylinder with or without auxiliary force. The braking pressure built up by the (tandem) master brake cylinder 8 is transferred to the wheel brakes 2 via hydraulic lines 10 having a pressure medium. The brake system 1 comprises two brake circuits I, II, wherein two wheel brakes 2-I-*a*, 2-I-*b* or 2-II-*a*, 2-II-*b* of the vehicle are included in one brake circuit I, II, respectively. The first brake circuit I is connected to the wheel brakes 2-I-*a*, 2-I-*b* of the front axle VA, and the wheel brakes 2-II-*a*, 2-II-*b* of the rear axle HA are connected to the second brake circuit II. The method according to an aspect of the invention can also be carried out with the same steps, however, in a brake system having a diagonal split brake circuit in which one wheel brake of the front axle VA and one wheel brake of the rear axle HA are therefore included in one brake circuit I, II in each case.

Since the two brake circuits I, II are designed hydraulically substantially identically in the example depicted in FIG. 1, only the components of the first brake circuit I are described in the following. A brake line 10 extending from the master brake cylinder 8 branches, after an isolating valve 20-I, which is open when currentless, i.e., without electrical control, into two brake lines leading to the wheel brakes 2-I-*a*, 2-I-*b* of the front axle VA, wherein provided in each line is an inlet valve 14-I-*a*, 14-I-*b*, respectively, which is open when currentless. Between each inlet valve 14-I-*a*, 14-I-*b* and the corresponding wheel brake 2-I-*a*, 2-I-*b*, a return line extends from each of the brake lines, wherein provided in each return line is an outlet valve 16-I-*a*, 16-I-*b*, respectively, which is closed when currentless. Both return lines are connected to a pressure accumulator 12-I via a common brake line piece. Brake circuit I comprises a hydraulic pump 22, which is driven by an electric drive motor and, as the second pressure source, can build up pressure independently of a brake activation by the driver. Sensor 31 is a rotational speed sensor for pump 22. The second pressure source 22 is connected to the pressure accumulator 12-I on the suction side. On the outlet side, the hydraulic pump 22 is connected to the brake line between the isolating valve 20-I and the inlet valves 14-I. A further brake line extends between the pressure accumulator 12-I and the suction side of the pump 22, via an electronic switching valve 18-I, which is closed when currentless, to the brake line between the master brake cylinder 8 and the isolating valve 20-I.

The brake system 1 is a regenerative brake system, which comprises not only the hydraulically actuated wheel brakes 2 but also an electric machine 4, which can be operated as a generator in order to generate electric energy. Therefore, when the electric regenerative brake 4 decelerates the vehicle, a battery of the vehicle can be charged, wherein the wheel brakes 2 are preferably not actuated while this takes place, in order to ensure efficient energy recuperation. The extent of the brake pedal actuation is detected via a displacement sensor 24, which is disposed on the brake pedal 6. In principle, however, it is also possible to use other sensors that deliver a signal which is proportional to the activation of the brake by the driver. In addition, a pressure sensor 26 is advantageously provided, which is located on the hydraulic line 10 of the brake circuit I extending to the tandem master cylinder 8 and determines the upstream pressure. During a brake activation at one (or more) of the wheels, if a substantial decrease in the measured wheel speed occurs, the inlet valve of the corresponding wheel brake can be closed and brake-slip control can be carried out according to methods known per se. In a preferred embodiment of the brake system, the braking pressure is determined at the friction brakes 2 of a brake circuit via pressure sensors 28-I, 28-II, which are disposed in a hydraulic line of a wheel brake 2-I-*a*, 2-II-*a*, respectively. In an alternative preferred embodiment of the brake system, the pressure in the wheel brakes is estimated on the basis of a model known per se.

For the control and/or regulation of the brake system 1, said system comprises an electronic control unit 30, which controls the electronically controllable hydraulic valves 14, 16, 18, 20 and the pump 22. In order to implement a brake feel via the brake pedal 6 that is as comfortable as possible for the driver, pressure medium can be diverted into the two pressure accumulators 12-I, 12-II during an operation of the electric regenerative brake 4. As depicted in greater detail in WO 2011/092308 A1, it is particularly preferable to first fill only the pressure accumulator 12-I of the first brake circuit I and to subsequently fill the pressure accumulator 12-II of the second brake circuit II (the sequence can also be reversed, in principle). Since the diversion of the pressure medium advantageously takes place by temporarily opening an outlet valve of the particular brake circuit, the fill level of the pressure accumulator can be determined on the basis of the opening time. It is particularly advantageous to account for a greater volumetric uptake of the wheel brakes 2-I-*a*, 2-I-*b* of the front axle VA by diverting more pressure medium into the pressure accumulator 12-I of the front axle brake circuit. As soon as the drag torque of the generator diminishes (e.g., because the speed of the vehicle is below a minimum speed that is suitable for the function of the generator), pressure medium present in the pressure accumulators 12 can be delivered to the wheel brakes 2 by means of the hydraulic pump 22 in order to build up additional braking torque in the wheel brakes 2.

At the beginning of a brake activation, therefore, preferably only the electric regenerative brake 4 or a generator is used for decelerating the motor vehicle. In this case, an outlet valve, e.g., the valve 16-I-*a* of a wheel of the front axle, is opened and pressure medium is diverted into the pressure accumulator 12-I. As soon as a specified fill level of the pressure accumulator is reached, which can be calculated, e.g., on the basis of the opening time and the opening cross-section of the open solenoid valve, the outlet valve 16-I-*a* is closed again. If the driver activates the pedal only to a limited extent (i.e., the activation lies in a specified interval), it may happen that only one pressure accumulator 12-I is filled, while the pressure accumulator 12-II of the second brake circuit II is empty, since the brake pedal 6 would have to be actuated even further for a subsequent filling of the second pressure accumulator 12-II. Depending on the extent of the actuation of the brake pedal, it is also possible that the pressure accumulator 12-II of the second brake circuit II may be only partially filled. If the driver brakes the vehicle to a standstill via substantially constant actuating travel, the minimum speed at which the generator 4 can effectuate a notable deceleration of the motor vehicle over the course of the braking process is undershot and blending is therefore required.

As a result, an outlet valve 16 (e.g., outlet valve 16-I-*a*), which may be open due to the filling of the pressure accumulator, is closed, the isolating valves 20-I, 20-II of the brake circuits are closed, and the hydraulic pump 22 is activated, which, in the brake system provided by way of example, is designed as a piston pump having six pistons moved by a common electric drive, wherein three pistons are assigned to one respective brake circuit. Therefore, pressure medium from the pressure accumulator 12-I is delivered to the wheel brakes 2-I-*a*, 2-I-*b* of the front axle in order to compensate for the decreasing braking effect of the generator. A negative pressure can form or vapor lock can occur in the brake circuit II due to a pressure accumulator 12-II being hardly filled or being already empty at the start.

If the bleeding condition is met or if the risk of vapor lock was detected, then, according to the invention, the electronic switching valve 18-II and the isolating valve 20-II of the brake circuit II having the emptied pressure accumulator 12-II are opened while the hydraulic pump 22 is running. Since the activation of the pedal by the driver lies in the interval having slow deceleration and, therefore, the pressure difference between the wheel brake and the master brake cylinder is limited, the pedal feel remains acceptable for the driver. A diminishing generator deceleration can still be compensated for by the pressure build-up in the first brake circuit I. It is advantageous when the electronic control unit 30 calculates a volume model of the pressure medium in the brake circuit II and the speed of the hydraulic pump is adjusted accordingly.

After the driver has released the brake pedal, the electronic switching valve 18-II of the rear axle and the electronic switching valve 18-I of the front axle are advantageously temporarily actuated, so that any brake fluid present in the pressure accumulators 12 can flow into the master brake cylinder 8 or into the unpressurized reservoir, which is connected to the master brake cylinder when the brake pedal is not actuated. In addition, the isolating valves 20-I, 20-II are opened. This can take place either before, during, or after the electronic switching valves 18 are opened.

Therefore, the electronic switching valve and the isolating valve of the relevant brake circuit are opened as soon as an empty pressure accumulator is detected while a pump is running. Vapor lock, with potentially dangerous effects on the braking effect, can therefore be avoided in the case of a gentle brake activation to a standstill.

The invention claimed is:

1. A method in which a brake system for a motor vehicle is controlled and/or regulated, which system comprises at least one electric regenerative brake and one or more wheel brakes to which pressure medium can be supplied from a first pressure source that can be actuated by the driver using a brake pedal and in which one or more brake circuits are disposed, wherein a first brake circuit of the one or more brake circuits has a pressure accumulator, a second pressure source comprising an electric hydraulic pump, which is connected to the pressure accumulator on the suction side, and at least two controllable valves, wherein, as soon as an activation condition is met, the first pressure source is separated from the wheel brakes by closing a first valve of the at least two controllable valves in at least one active brake circuit of the one or more brake circuits, and pressure medium is delivered from the pressure accumulator into at least one wheel brake by activating the second pressure source, wherein a second valve of the at least two controllable valves, which is disposed between the pressure accumulator and the first pressure source, of the at least one active brake circuit, and the first valve of the at least one active brake circuit are opened during operation of the second pressure source when a bleeding condition is met.

2. The method as claimed in claim 1, wherein the bleeding condition is met only when the activation of a brake pedal activated by the driver lies in a specified interval at a specified time or for a specified period of time after the activation condition is met and/or after activation of the second pressure source, wherein, a displacement or angle sensor connected to the brake pedal is considered.

3. The method as claimed in claim 1, wherein the bleeding condition is met only when the pressure accumulator of at least a first brake circuit contains less than a specified volume of the pressure medium and/or the second pressure source of at least a first brake circuit has delivered the pressure medium during at least one specified period of time.

4. The method as claimed in claim 1, wherein the activation condition is met when the activation of a brake pedal activated by the driver exceeds a specified extent, wherein, a displacement or angle sensor connected to the brake pedal is considered, and/or the braking torque that is built up by and/or can be attained by the electric regenerative brake drops below a specified threshold value.

5. The method as claimed in claim 1, wherein the one or more brake circuits comprises the first brake circuit and a second brake circuit, the second brake circuit also having a pressure accumulator, a second pressure source, a controllable first valve, that is open when currentless, which is disposed between the first pressure source and the wheel brakes, and a controllable second valve, that is closed when currentless, which is disposed between the pressure accumulator and the first pressure source, wherein the first and second brake circuits further have at least one controllable third valve, that is closed when currentless, which is disposed between a respective wheel brake and the respective pressure accumulator, and, during a braking process, the pressure medium is first diverted into the pressure accumulator of the first brake circuit and subsequently into the pressure accumulator of the second brake circuit by opening the respective controllable third valve, wherein the activation condition is met only when the pressure medium was diverted at least into the pressure accumulator of the first brake circuit.

6. The method as claimed in claim 5, wherein the second pressure source of the first and the second brake circuit are simultaneously activated, and, when the bleeding condition is met, the second valve and the first valve of the brake circuit having the pressure accumulator with the lower fill level are opened, wherein the fill level is determined on the basis of a duration and/or an opening cross-section and/or a valve flow of the respective controllable third valve and/or a duration of the activation and/or a variable characterizing the pressure generation of the respective second pressure source.

7. The method as claimed in claim 5, wherein the second valves of the first as well as the second brake circuit are temporarily opened after the brake pedal is no longer activated and/or if the second pressure sources were deactivated.

8. The method as claimed in claim 5, wherein when the bleeding condition is met, the first valve of the brake circuit having the pressure accumulator with the higher fill level is also opened.

9. A brake system for a motor vehicle, comprising:
at least one electric regenerative brake and one or more wheel brakes to which a pressure medium can be supplied from a first pressure source that can be actuated by the driver by a brake pedal, and in which one or more brake circuits are disposed, wherein a first brake circuit of the one or more brake circuits has a pressure accumulator, a second pressure source, and at least two controllable valves,
wherein as soon as an activation condition is met, an electronic control unit separates the first pressure source from the wheel brakes by closing a first valve of the at least two controllable valves in at least one active brake circuit of the one or more brake circuits, and pressure medium is delivered from the pressure accumulator into at least one wheel brake by activating the second pressure source, and
wherein the electronic control unit opens a second valve of the at least two controllable valves, which is disposed between the pressure accumulator and the first pressure source, of the at least one active brake circuit, and opens the first valve of the at least one active brake circuit during operation of the second pressure source when a bleeding condition is met.

10. A brake system for a motor vehicle, comprising:
at least one electric regenerative brake, and
one or more wheel brakes to which a pressure medium can be supplied from a first pressure source that can be actuated by the driver by a brake pedal, and in which one or more brake circuits are disposed,
wherein a first brake circuit of the one or more brake circuits has a pressure accumulator, a second pressure source and at least two controllable valves,
wherein assigned to each wheel brake of the first brake circuit is an inlet valve comprising a solenoid valve that is open when currentless, and disposed between the first pressure source and the respective wheel brake, and an outlet valve disposed between the respective wheel brake and the pressure accumulator of the first brake circuit, wherein the second pressure source of the first brake circuit is connected to the pressure accumulator on the suction side and, on the outlet side, is disposed between the first pressure source and the inlet valves of the first brake circuit, an isolating valve that is open when currentless, is disposed between the outlet side of the second pressure source and the first pressure source, and a switching valve that is closed when currentless, is disposed between the suction side of the second pressure source and the first pressure source, wherein an electronic control unit controls the respective isolating valve as the first valve and the switching valve as the second valve during the implementation of the method as claimed in claim 1 in the first brake circuit.

11. A method as claimed in claim 1, wherein the second pressure source is an electric hydraulic pump.

12. The brake system as claimed in claim 9, wherein the first pressure source is a tandem master brake cylinder.

* * * * *